United States Patent [19]
Tomisawa

[11] Patent Number: 5,343,745
[45] Date of Patent: Sep. 6, 1994

[54] APPARATUS AND METHOD FOR DETECTING INTAKE AIR QUANTITY FOR INTERNAL COMBUSTION ENGINE

[75] Inventor: Naoki Tomisawa, Isezaki, Japan

[73] Assignee: Japan Electronic Control Systems Co., Ltd., Isezaki, Japan

[21] Appl. No.: 2,837

[22] Filed: Jan. 15, 1993

[30] Foreign Application Priority Data

Jan. 17, 1992 [JP] Japan ................................ 4-006949

[51] Int. Cl.$^5$ .............................................. G01F 1/68
[52] U.S. Cl. .............................. 73/204.18; 73/118.2; 123/491
[58] Field of Search ..................... 73/118.2, 204.18; 364/510; 123/491

[56] References Cited

U.S. PATENT DOCUMENTS 4,578,996 4/1986 Abe et al. ...................... 73/118.2

FOREIGN PATENT DOCUMENTS 59-78926 5/1984 Japan.

*Primary Examiner*—Herbert Goldstein
*Attorney, Agent, or Firm*—Foley & Lardner

[57] ABSTRACT

An apparatus for detecting an intake air quantity for an internal, combustion engine and method therefor are disclosed in which a passed time from a time at which a power supply to a temperature sensitive airflow meter of a bridge circuit is turned on is measured as t. A CPU of the detecting apparatus retrieves a data on the intake air quantity from a data map storing the data on the intake air quantity, the passed time and output voltage of the temperature sensitive airflow meter to derive the intake air quantity data $Q_{now}$. In addition, the CPU adds a value of a change rate of the present mapped data with respect to the previously derived final intake air quantity data $Q_{-1}$ which is multiplied by a predetermined coefficient k to $Q_{now}$. The result of addition is set as the present final intake air quantity data: $Q \leftarrow Q_{now} + k(Q_{now} - Q_{-1})$. It is noted that the predetermined coefficient k is varied according to the passed time t.

9 Claims, 3 Drawing Sheets

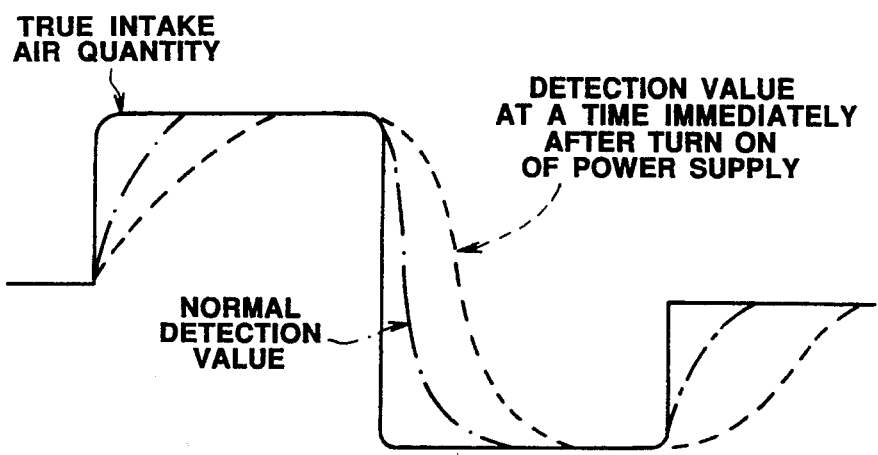
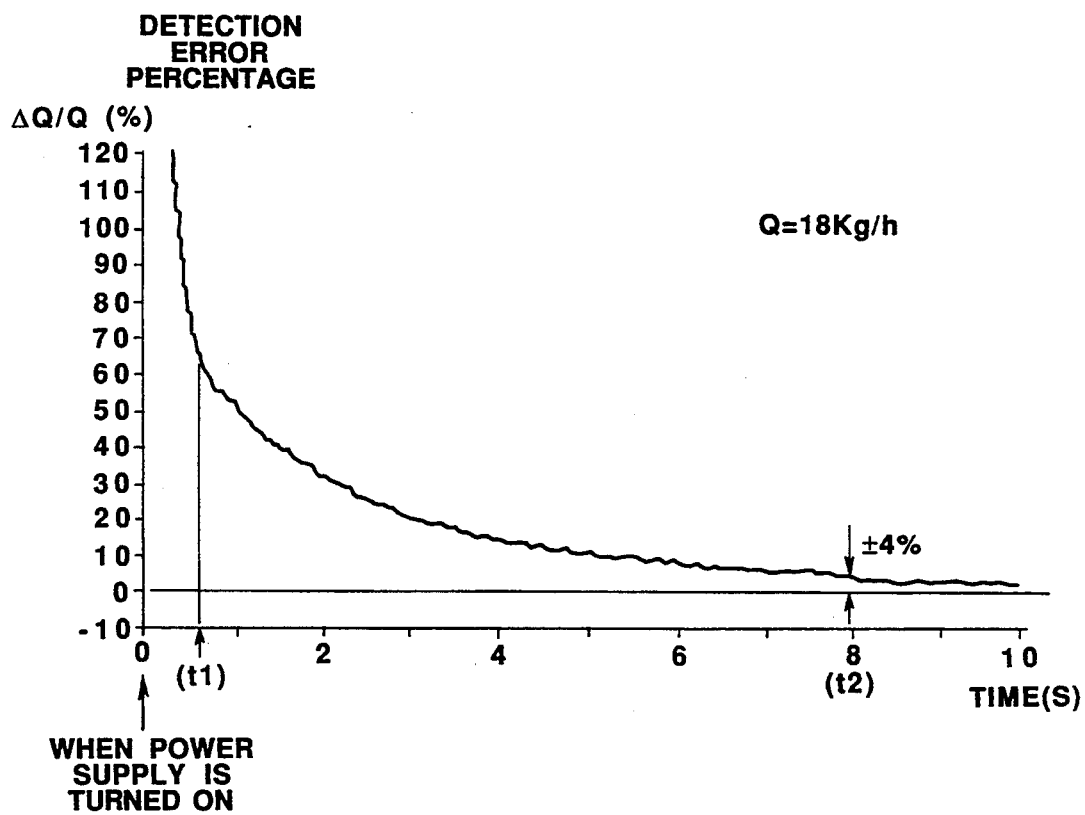

APPARATUS AND METHOD FOR DETECTING INTAKE AIR QUANTITY FOR INTERNAL COMBUSTION ENGINE

BACKGROUND OF THE INVENTION

1. Field of The Invention

The present invention relates to an apparatus and method for detecting intake air quantity for internal combustion engine which compensate for a response delay of detection at a time immediately after a power supply is turned on to supply a power to a temperature sensitive airflow meter detecting the intake air quantity sucked into internal combustion engine on a basis of a resistance change in a temperature-sensitive resistor disposed in an intake air passage of the internal combustion engine.

2. Description of The Background Art

In an electronic controlled fuel injection apparatus installed in an internal combustion engine, an airflow meter to detect an intake air quantity Q of the engine is provided and a basic fuel injection quantity Tp is calculated as $Tp = K \times Q/N$ (K denotes a constant) from the intake air quantity Q detected by the airflow meter and an engine revolution speed N.

A temperature-sensitive airflow meter used in the above-described electronically controlled fuel injection apparatus is used which is disclosed in a Japanese Utility Model Registration Application First Publication No. Showa 59-78926.

The temperature-sensitive airflow meter includes a hot-wire type or hot-film type temperature sensitive resistor disposed in an intake air passage. A current is supplied to the temperature-sensitive resistor to generate heat on the temperature-sensitive resistor towards a constant temperature (resistance value). A temperature reduction due to an exposure to the intake air is compensated for by an increase in the supply current, deriving the intake air quantity from the current value.

Although a structure of the temperature-sensitive flow meter will be described in the DETAILED DESCRIPTION OF THE PREFERRED EMBODIMENT with reference to FIG. 2, the temperature-sensitive airflow meter will be explained below:

A bridge circuit B is constituted by a temperature compensation resistor $R_k$, reference resistor $R_s$, and fixed resistors $R_1$ and $R_2$ in addition to the temperature sensitive resistor $R_H$ (hot-wire or hot-film).

A differential amplifier OP has positive and negative input terminals to which a junction between the temperature compensating resistor $R_k$ and $R_1$ and first resistor $R_2$ is connected to receive a terminal voltage across the fixed resistor $R_2$ and to which a junction between the temperature-sensitive resistor $R_H$ and reference resistor $R_s$ is connected to receive a terminal voltage across the reference resistor $R_s$, respectively.

A supply current to the bridge circuit B via a transistor Tr is corrected according to an output off the differential amplifier OP.

In detail,s, when the intake air quantity of the engine is, for example, increased with the bridge circuit B in an equilibrium state, the temperature-sensitive resistor $R_H$ is cooled by its air stream passing therethrough so that its resistance value is accordingly reduced and a terminal voltage across the reference resistor $R_s$ is increased so that the bridge circuit B is not in the equilibrium state. Consequently, the output current of the differential amplifier OP is increased. The supply current to the bridge circuit B is thereby increased through the transistor Tr so as to heat the temperature sensitive resistor $R_H$. Therefore, the resistance value of the resistor $R_H$ is increased so that the equilibrium state of the bridge circuit B is recovered.

For example, when a temperature of the intake air is reduced, the temperature-sensitive resistor $R_H$ is cooled and its resistance value is reduced. However, since the temperature compensating resistor $R_K$ which is in the same atmosphere as the temperature-sensitive resistor $R_H$ is simultaneously cooled and its resistance value is also reduced. Consequently, a change in the current value supplied to the bridge circuit B due to the change in the temperature of the intake air is suppressed.

Hence, the intake air quantity of the engine and supply current to the bridge circuit B correspond to each other irrespective of the temperature of the intake air. Consequently, the intake air quantity can be measured by detecting the terminal voltage across the reference resistor $R_s$.

As described above, the control of the supply current is carried out so as to maintain the temperature of the temperature-sensitive resistor at a constant in the temperature-sensitive type flow meter using the temperature-sensitive resistor. Therefore, a predetermined period of time is required according to the thermal capacity of the temperature-sensitive resistor in order for the temperature-sensitive resistor in an ambient temperature state to reach a normal control temperature (,e.g., approximately 400° C.) upon a turn on of a power supply to the bridge circuit B.

Especially, the temperature sensitive airflow meter of the hot-film type generally having a large thermal capacity requires a relatively long term until reaching the normal control temperature, as compared with the hot-wire type.

During the time when the temperature of the temperature-sensitive resistor reaches from the at the time when the power supply is turned on to the proximity to the normal control temperature, the bridge circuit: B is not in the equilibrium state so that a large current is supplied thereto in order to increase the temperature of the temperature-sensitive resistor. The large current at that time is not caused by the temperature reduction in the temperature-sensitive resistor due to the increase in the intake air flow quantity but is required to increase the temperature of the temperature-sensitive resistor from the ambient temperature level to the proximity to the normal control temperature level. Consequently, during the time at which the temperature of the temperature-sensitive resistor increases from that immediately after the power supply is turned on to the proximity to the normal control temperature, the intake air quantity cannot accurately be detected, as the actual matter of fact, and the detected intake air quantity is largely deviated from a true intake air quantity.

Thus, if the engine is in a start condition until the temperature of the temperature-sensitive resistor reaches the vicinity to the normal control temperature, the basic fuel injection quantity Tp is calculated on the basis of a larger air quantity than the true (real) intake air quantity. Consequently, an air-fuel mixture ratio of an air mixture fuel sucked to the engine is enriched and an ill influence of the rich air/fuel mixture ratio may be given to an engine start characteristic and exhaust gas characteristics.

Furthermore, as shown in FIG. 2, an error characteristic is varied according to the passed time t upon the power supply turn on. Therefore, the influence on the start characteristic is varied depending on the time duration from the time at which the power supply is turned on to the time at which the engine start is carried out.

It is noted that FIG. 2 shows a result of experiment in which the temperature-sensitive resistor is disposed in an air stream having a constant flow quantity and the detection error is monitored which is decreased with the increase in the temperature of the temperature-sensitive resistor upon the power supply turn on FIG. 2, in other words, shows a static error characteristic which accords with the passed time described above.

A Japanese Patent Application No. Heisei 3-312452 exemplifies a previously proposed temperature-sensitive airflow meter in which the detection error during the time duration from the time at which the power supply is turned on to the time at which the temperature of the temperature-sensitive resistor reaches the normal control temperature is simulated on the basis of the passed time upon the turn on of the power supply to the temperature sensitive airflow meter and a characteristic such that the output voltage of the temperature sensitive airflow meter is converted into the data of the intake air flow quantity is corrected on the basis of the passed time.

However, if the intake air quantity is changed during the time duration at which the temperature of the temperature-sensitive resistor does not reach the normal control temperature, the value of supply current to the temperature-sensitive resistor is different from that at the normal control time and, therefore, a responsive characteristic in the detection signal with respect to the change in the air flow quantity is different. In general, it was indicated that a detection response delay occurred due to a large temperature difference of an initial time at which the power supply was turned on from that at the time when the normal control temperature was reached.

Hence, in the case of the previously proposed airflow meter correction structure described above, when the intake air flow quantity is constant (in the static state), a desired correction can be made. However, when the intake air flow quantity is changed (in a dynamic state), a large response delay occurs as denoted by a dotted line shown in FIG. 1.

It is noted that a solid line shown in FIG. 1 denotes the true intake air quantity change and a do-and dash line denotes a normally detected intake air quantity with the temperature of the temperature sensitive resistor being the normal control temperature. Consequently, only in the correction control based on the passed time described above, it is impossible to compensate for the detection characteristic with a high accuracy from the time when the power supply is turned on to the time at which the temperature of the temperature-sensitive resistor reaches the normal control temperature.

SUMMARY OF THE INVENTION

It is, therefore, a principal object of the present invention to provide an intake air quantity detecting apparatus and method in which a generation of detection response delay of the intake air quantity can be compensated for with high accuracy during a time duration from a time at which a power supply to a temperature-sensitive resistor is turned on to a time at which a temperature of temperature-sensitive resistor reaches the proximity to a normal control temperature so that a fuel supply control which responds quickly to the change in the intake air flow quantity during the time duration of temperature increase of the temperature-sensitive resistor from the time at which the power supply is turned on can be achieved.

The above-described object can be achieved by providing an apparatus for detecting an intake air quantity for an internal combustion engine, comprising:

a) a temperature sensitive airflow meter having a temperature-sensitive resistor disposed in an intake air passage and which is so constructed as to output a detection signal based on a change in a value of a resistance of the temperature-sensitive resistor according to an intake airflow quantity through the temperature-sensitive resistor, the detection signal corresponding to the intake air quantity of the engine;

b) passed time measuring means for measuring a passed time upon a turn on of a power supply to the temperature sensitive airflow meter;

c) change rate calculating means for calculating a change rate between a detection value of the intake air quantity before a predetermined period of time and the present detection value by means of the temperature sensitive airflow meter;

d) intake air quantity correcting means for outputting the detection value derived by an addition of a value of the change rate calculated by the change rate calculating means multiplied by a predetermined coefficient to the present detection value as a present final detection value; and e) coefficient varying means for variably setting the predetermined coefficient according to the measured passed time.

The above-described object can also be achieved by providing a method for detecting an intake air quantity for an internal combustion engine, comprising the steps of:

a) outputting a detection signal based on a change in a value of a resistance of a temperature-sensitive resistor disposed in an intake air passage of the engine according to an intake airflow quantity through the temperature-sensitive resistor, the detection signal corresponding to the intake air quantity of the engine;

b) measuring a passed time upon a turn on of a power supply to the temperature sensitive airflow meter;

c) calculating a change rate between a detection value of the intake air quantity before a predetermined period of time and the present detection value by means of the temperature sensitive airflow meter; and d) outputting the detection value derived by an addition of a value of the change rate calculated by the change rate calculating means multiplied by a predetermined coefficient to the present detection value as a present final detection value of the intake air quantity, with variably setting the predetermined coefficient according to the measured passed time.

BRIEF DESCRIPTION OF THE DRAWINGS

FIG. 1 is a characteristic graph of detection of the intake air quantity, in a case when a previously proposed intake air quantity detecting apparatus detects an intake air quantity with no correction when a power supply to a temperature-sensitive airflow meter is turned on, with respect to a true intake air flow quantity;

FIG. 2 is a characteristic graph of an error detection percentage with respect to a time it takes to hot a hot-film type resistor from a time (passed time) when a power supply to a bridge circuit of an airflow meter of a hot film type is turned on.

DESCRIPTION OF THE PREFERRED EMBODIMENT

Reference will hereinafter be made to the drawings in order to facilitate a better understanding of the present invention.

The detailed explanation of FIGS. 1 and 2 has already made in the BACKGROUND OF THE INVENTION.

Figure 3:
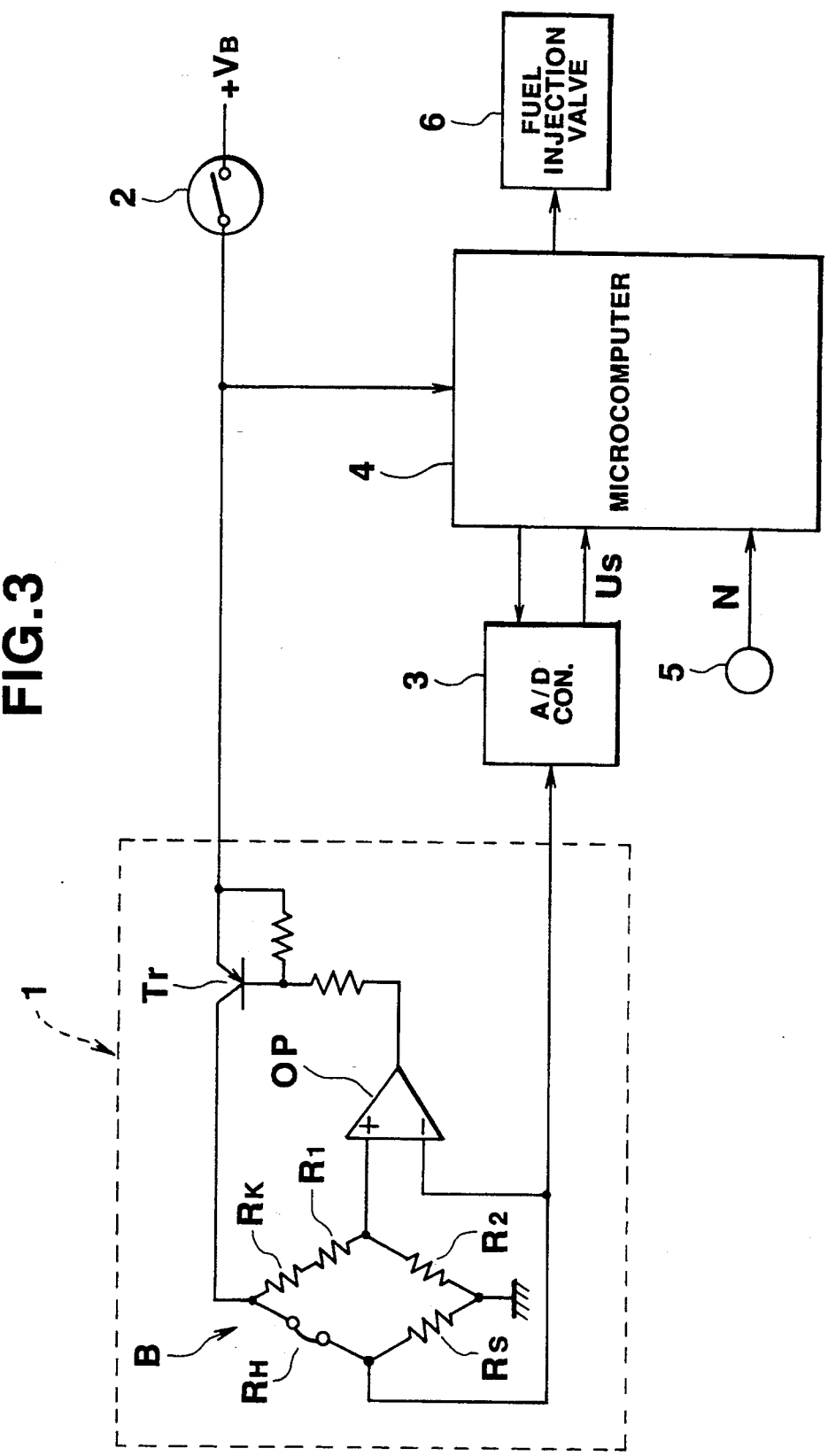
FIG. 3 is a circuit block diagram of an intake air flow quantity detecting apparatus in a preferred embodiment according to the present invention, and FIG. .4 is a flowchart of detecting and calculating an intake air flow quantity supplied to an internal combustion engine in the Intake air flow quantity detecting apparatus shown in FIG. 3.

FIG. 3 shows a preferred embodiment of an intake air flow quantity detecting apparatus according to the present invention.

However, since the structure of the intake air quantity detecting apparatus in the preferred embodiment is substantially equal to that in the previously proposed apparatus disclosed in a Japanese Utility Model Registration First Publication No. Showa 59-78926 explained in the BACKGROUND OF THE INVENTION, the detailed explanation will be omitted herein.

In FIG. 3, numeral 1 denotes a temperature sensitive airflow meter, symbol B denotes a bridge circuit, numeral 2 denotes an ignition switch, numeral 3 denotes an A/D converter, numeral 4 denotes a microcomputer having a ROM, RAM, CPU, common bus, and I/O unit, numeral 5 denotes a crank angle sensor to produce an engine revolution speed N, and numeral 6 denotes a fuel injection valve(s).

The power supply voltage (battery voltage) $V_B$ is applied to the temperature sensitive airflow meter 1 via the ignition switch 2. The output voltage $U_s$ of the temperature sensitive airflow meter 1 is input to the microcomputer 4 via the A/D converter 3.

Various sensors including the crank angle sensor 5 are connected to the microcomputer 4 to detect the engine driving conditions. The microcomputer 4 calculates the basic fuel injection quantity as $Tp = K \times Q/N$ (K denotes a constant) from the detected intake air quantity Q and engine revolution speed N and calculates a final fuel injection quantity Ti, correcting appropriately the basic fuel injection quantity Tp with an engine coolant temperature or other engine driving conditions. A pulse signal having a pulse width corresponding to the calculated final fuel injection quantity Ti is output to the electromagnet type fuel injection valve 6 at a predetermined timing synchronized with the engine revolution so as to electronically control the fuel supply to the engine.

Figure 4:
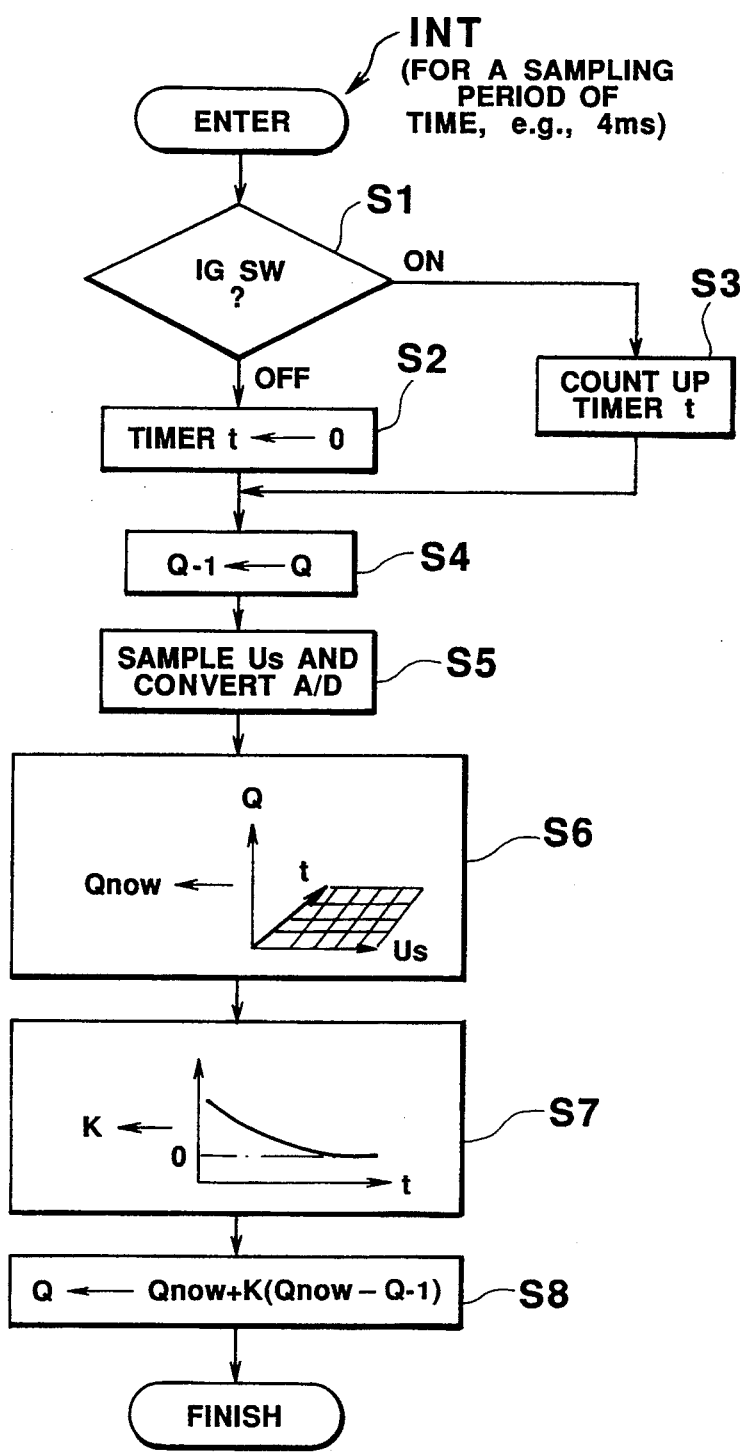

FIG. 4 shows an operational flowchart executed by the microcomputer 4 which indicates the preferred embodiment of detecting the intake air quantity Q.

The flowchart shown in FIG. 4 is executed in an interrupt mode whenever a predetermined sampling period is passed (for example, 4 ms).

Using the final detected value in FIG. 4, the basic fuel injection quantity Tp is calculated.

In a step S1, the CPU determines whether the ignition switch 2 is turned on.

If the ignition switch 2 is turned off, the routine goes to a step S2 in which a timer to measure a passed time t from a time at which the power supply to the airflow meter 1 is turned on is reset to zero. If the ignition switch 2 is turned on, the routine goes to a step S3 in which a count up of the timer is carried out to measure the passed time t.

In a step S4, the data on the intake air quantity Q derived finally during a previous execution of the program shown in FIG. 4 is set as $Q_{-1}$ as a previous value.

Next, In a step S5, the output voltage $U_s$ of the temperature sensitive air flow meter 1 is converted into the corresponding digital value and is read therein.

Then, in a step S6, the CPU refers to a map of data of intake air quantity $Q_{now}$, the output voltage $U_s$ of the temperature sensitive airflow meter 1 and passed time t measured by the timer being the parameters and retrieves the data of the intake air stream quantity $Q_{now}$ corresponding to the latest output voltage $U_s$ and passed time t.

In more detail, immediately after the power supply to the temperature sensitive airflow meter 1 is turned on, the detection error is gradually converged with the characteristic corresponding to the passed time t, as shown in FIG. 1, during an interval of time, the temperature of the temperature sensitive resistor $R_H$ reaching from the ambient temperature to the proximity to the normal control temperature. Therefore, with the error characteristic (detection error under a constant airflow quantity condition) being previously derived according to the passed time upon the turn on of the power supply to the airflow meter 1 by means of its experiment, the map is previously prepared, the passed time t and output voltage $U_s$ being the parameters so as to derive the true intake air quantity $Q_{now}$ from the output voltage $U_s$ with the error quantity taken into consideration.

Hence, even if the Intake air quantity Q derived in the step S5 has a value such that the output voltage $U_s$ is largely different from the true intake air quantity Q, it is the intake air quantity Q whose error quantity is determined according to the passed time t upon the turn on of the power supply.

However, the map data of the intake air quantity $Q_{now}$, both passed time t and output voltage $U_s$ being the parameters, can serve to compensate for the detection error under the constant intake air quantity but cannot serve to compensate for the response delay generated at the characteristic which accords with the passed time t.

Therefore, in a step S7, in order to compensate for such a response delay as described above, a predetermined coefficient k which corresponds to a magnitude of generation of the response delay is set according to the passed time t measured by the timer.

It is noted that since as the passed time t is short and when the temperature of the temperature-sensitive resistor is low as compared with the normal control temperature, a large response delay occurs and if the temperature-sensitive resistor reaches the proximity of the normal control temperature, the detection of the air flow quantity is carried out with a normal allowable response delay, the predetermined coefficient k is set to a larger value as the passed time t is less and is set to zero when the passed time t becomes a time at which the temperature of the temperature-sensitive resistor can reach the normal control temperature so that no substantive correction of the value of airflow quantity is not made.

In a step S8, the final detection value Q in which the correction of the response delay is carried out using the coefficient k is derived: $Q \leftarrow Q_{now} + k(Q_{now} - Q_{-1})$.

It is herein noted that $Q_{-1}$ denotes a result of calculation of the above calculation formula at the time of a previous execution of FIG. 4 (a previous final detection value) and $Q_{now}$ in the calculation formula denotes the intake air quantity data when the output voltage $U_s$ and passed time t at the present execution of step S6.

That is to say, a change rate of the intake air quantity data $Q_{now}$ derived in the present step S6 with respect to the final detection value $Q_{-1}$ of the previous execution of FIG. 4 is derived, the change rate $(Q_{now} - Q_{-1})$ multiplied by the predetermined coefficient k is added to the present detection value $Q_{now}$, and the result of addition is the final detection value Q.

Since the final detection value Q is a value of the change in the detection value by means of the temperature sensitive airflow meter which is amplified, the detection response can deceptively be quickened. In addition, since the amplification factor is changed according to the passed time t, the response delay correction can be made which corresponds to the response characteristic varied according to the passed time t.

Hence, during the time duration from the time at which the power supply to the temperature sensitive airflow meter 1 is turned on to the time at which the temperature of the temperature-sensitive resistor reaches approximately the normal control temperature, the response delay of the airflow meter 1 can be corrected. In addition, in the preferred embodiment, since the correction of the response delay is carried out on the basis of the corrected data $Q_{now}$ in which the static detection error is corrected with the passed time t being served as the parameter, the Intake air quantity data Q which is corrected in view of the static detection error together with the response delay which is the dynamic detection error can finally be derived.

Consequently, the data on the intake air quantity Q at the time immediately after the power supply to the airflow meter 1 is turned on from the temperature sensitive airflow meter 1 can be approached to time true value so that an accuracy of the fuel supply control based on the detection value of the intake air quantity Q can be improved.

It Is noted that although, in the preferred embodiment, the response delay correction is made on the basis of the intake air quantity $Q_{now}$ which is corrected and is compensated For the static detection error derived on the basis of the passed time t and output voltage $U_s$, the output voltage $U_s$ of the temperature sensitive airflow meter 1 may directly be converted into the detection value of the intake air quantity, the converted value being based to correct the response delay. In this case, although an absolute level has an error, the response delay can be compensated.

As described hereinabove, since according to the present invention the response delay can be corrected with the characteristics corresponding to the passed time upon the turn on of the power supply to the airflow meter, the detection response characteristic can be secured during the time duration until the time at which the temperature of the temperature-sensitive resistor reaches the proximity of the normal control temperature. Consequently, the fuel supply control can be achieved such as to respond to the change in the intake air quantity with a preferable response characteristics during the time duration from the time at which the power supply is turned on and during which the temperature of the temperature-sensitive resistor increases and reaches to the normal control temperature.

In addition, since the detection data determined from the detection signal of the temperature sensitive airflow meter and data on the passed time is used as the detection value of the intake air quantity For which the correction against the response delay is made, the compensation for the static detection error can be achieved together with the correction of the response delay.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claim:

1. An apparatus for detecting an intake air quantity for an internal combustion engine, comprising:
   a) a temperature sensitive airflow meter having a temperature-sensitive resistor disposed in an intake air passage and which is so constructed as to output a detection signal based on a change in a value of a resistance of the temperature-sensitive resistor according to an intake airflow quantity through the temperature-sensitive resistor, the detection signal corresponding to the intake air quantity of the engine;
   b) passed time measuring means for measuring a passed time upon a turn on of a power supply to the temperature sensitive airflow meter;
   c) change rate calculating means for calculating a change rate between a detection value of the intake air quantity before a predetermined period of time and the present detection value by means of the temperature sensitive airflow meter;
   d) intake air quantity correcting means for outputting the detection value derived by an addition of a value of the change rate calculated by the change rate calculating means multiplied by a predetermined coefficient to the present detection value as a present final detection value; and
   e) coefficient varying means for variably setting the predetermined coefficient according to the measured passed time.

2. An apparatus for detecting an intake air quantity for an internal combustion engine as set forth in claim 1, which further includes:
   f) air flow quantity data memory means For previously storing data on the intake air quantity, the passed time and detection signal of the temperature sensitive airflow meter being parameters; and
   g) intake air quantity searching means for retrieving and deriving the data on the intake air quantity from the air flow quantity data memory means on the basis of the measured passed time and detection signal from the temperature sensitive airflow meter and outputting the searched intake air quantity as the detection value in the temperature-sensitive airflow meter, and wherein said change rate calculating means and intake airflow quantity correcting means use the detection value of the intake air quantity searched and output from the intake air quantity searching means.

3. An apparatus for detecting an intake air quantity for an internal combustion engine as set forth in claim 2, wherein the predetermined coefficient reduces as the elapsed time increases.

4. An apparatus for detecting an intake air quantity for an internal combustion engine as set forth in claim 3, wherein said intake air quantity correcting means outputs the present final detection value as follows: $Q \leftarrow Q_{now} + k(Q_{now} - Q_{-1})$, wherein $Q_1$ denotes the result of calculation at the predetermined period of time before the present calculation, k denotes the predetermined coefficient, and $Q_{now}$ denotes the present intake air quantity data derived on the basis of the parameters of an output voltage $U_s$ from the temperature sensitive airflow meter and passed time t.

5. An apparatus for detecting an intake air quantity for an internal combustion engine as set forth in claim 4, wherein said predetermined coefficient k becomes zero when the measured passed time t indicate a time at which the temperature of the temperature-sensitive resistor has substantially reached a normal control temperature and said predetermined period of time is a sampling period of time at which an interrupt routine of detecting the intake air quantity is excerpted.

6. An apparatus for detecting an intake air quantity for an internal combustion engine as set forth in claim 5, wherein said sampling period of time is substantially four milliseconds.

7. An apparatus for detecting an intake air quantity for an internal combustion engine as set forth in claim 6, wherein the output voltage $U_s$ of said airflow meter is a terminal voltage across a reference resistor $R_s$ which is connected to the temperature-sensitive resistor which is connected to a battery voltage via an ignition switch and a transistor, both reference and temperature-sensitive resistors constituting a bridge circuit with a temperature compensating resistor $R_k$ and fixed resistors $R_1$ and $R_2$.

8. An apparatus for detecting an intake air quantity for an internal combustion engine as set forth in claim 7, wherein said normal control temperature is substantially 400° C.

9. A method for detecting an intake air quantity for an internal combustion engine and controlling a fuel supply quantity on the basis of the detected intake air quantity, comprising the steps of:
  a) detecting a change in a value of a resistance of a temperature-sensitive resistor disposed in an intake air passage of the engine according to an intake airflow quantity through the intake air passage, and outputting a detection signal corresponding to the intake air quantity of the engine:
  b) measuring a time interval upon a turn on of a power supply to the temperature-sensitive airflow meter;
  c) calculating a change rate between a detection value of the intake air quantity before a predetermined period of time and a present detection value by means of the temperature-sensitive airflow meter;
  d) outputting a signal representing a present final detection value of the intake air quantity, said present final detection value being derived by an addition of a value of the change rate calculated in the step c) multiplied by a predetermined coefficient to the present detection value, the predetermined coefficient being variably set according to the measured time interval; and
  e) controlling a fuel quantity supplied to the engine on the basis of said signal representing said Present final detection value of the intake air flow quantity output in said step d).

* * * * *